US007477503B2

(12) United States Patent
Aszmus

(10) Patent No.: US 7,477,503 B2
(45) Date of Patent: Jan. 13, 2009

(54) CIRCUIT PROTECTION DEVICE

(75) Inventor: Gregory P. Aszmus, Salt Lake City, UT (US)

(73) Assignee: EFI Electronics Corporation, Salt Lake City, UT (US)

(*) Notice: Subject to any disclaimer, the term of this patent is extended or adjusted under 35 U.S.C. 154(b) by 435 days.

(21) Appl. No.: 11/119,365

(22) Filed: Apr. 30, 2005

(65) Prior Publication Data

US 2006/0245125 A1 Nov. 2, 2006

(51) Int. Cl.
*H02H 1/00* (2006.01)

(52) U.S. Cl. ....................... 361/124; 361/103; 361/104; 361/111; 361/117; 361/127

(58) Field of Classification Search .................. 361/56, 361/91.1, 103–106, 111, 117–118, 124, 126–127
See application file for complete search history.

(56) References Cited

U.S. PATENT DOCUMENTS

| | | | | | |
|---|---|---|---|---|---|
| 4,652,964 | A | * | 3/1987 | Ziegenbein | 361/54 |
| 4,720,759 | A | * | 1/1988 | Tabei | 361/105 |
| 4,887,183 | A | * | 12/1989 | Biederstedt et al. | 361/124 |
| 5,574,614 | A | * | 11/1996 | Busse et al. | 361/119 |
| 5,808,850 | A | * | 9/1998 | Carpenter, Jr. | 361/127 |
| 5,901,027 | A | * | 5/1999 | Ziegler et al. | 361/124 |
| 6,040,971 | A | * | 3/2000 | Martenson et al. | 361/118 |
| 6,211,770 | B1 | * | 4/2001 | Coyle | 338/21 |
| 6,430,019 | B1 | | 8/2002 | Martenson et al. | 361/124 |
| 2005/0231872 | A1 | * | 10/2005 | Schimanski et al. | 361/91.1 |

FOREIGN PATENT DOCUMENTS

| | | | | |
|---|---|---|---|---|
| EP | 0716493 | A1 | * | 12/1995 |
| EP | 1077452 | A2 | | 2/2001 |
| EP | 1098418 | A2 | | 5/2001 |
| EP | 1098418 | A2 | * | 9/2001 |

* cited by examiner

*Primary Examiner*—Michael J Sherry
*Assistant Examiner*—Terrence R Willoughby

(57) ABSTRACT

A circuit protection device including a conductor arm releasably connected between a voltage sensitive device and a circuit to be protected. The connector arm is biased to move in a direction generally parallel with a plane defined by a lateral dissection between the releasably connected conductor arm and the voltage sensitive device.

38 Claims, 6 Drawing Sheets

CIRCUIT PROTECTION DEVICE

TECHNICAL FIELD

The present invention relates to overvoltage protection devices for electrical circuits and equipment; and more specifically, to a circuit protection device.

BACKGROUND OF THE INVENTION

Electronic protection devices such as voltage surge protectors are commonly used to protect electric or electronic equipment such as PLCs, computers, and entire electrical installations against destructive overvoltage surges. Such surge protection devices guard the electronic circuitry against detrimental power surges generated from various sources, including, but not limited to: motors, transformers, welding machines, lightning strikes, and power-grid-switching by the energy supplier. To protect against unacceptable voltage surges, voltage sensitive devices are employed to absorb or shunt current safely away from a circuit to be protected.

A very useful voltage sensitive device is a varistor such as a metal oxide varistor (MOV). MOVs are solid-state surge protective devices widely used with low-voltage AC circuits to protect electrical devices and sensitive loads. Varistors are non-linear electronic devices generally comprised of a ceramic compound for example, zinc oxide (ZnO) granules doped with other compounds—principally oxides of bismuth, cobalt, manganese, chromium, and tin. The material is fabricated by mixing finely powdered constituents of a binder agent. This mixture is pressed into thin disks and then fired in an oxidizing atmosphere at around 1200° C. The two faces of the disks are then coated with an electrically conducting compound and terminals are attached by soldering. The assembly is then coated with a thin covering of epoxy or other insulating material to provide electrical insulation and mechanical protection.

At nominal power system levels, a varistor presents a high resistance to a circuit and does not conduct any significant current. However, in a transient power surge condition, the varistor can be utilized to limit the transient over-voltage and to divert transient current surges away from the circuits to be protected. The effect of the varistor can be scaled to handle larger surge currents and energies by increasing the size of the varistor or by connecting multiple varistors in parallel. A varistor can be designed to limit transient voltages in circuits to be protected to a specified level can also be designed and configured to divert transient currents of specified current levels and/or wave shapes.

A chief characteristic of a varistor is that over a wide range of electrical current, the voltage drop across the varistor remains within a narrow band commonly called the varistor voltage. A log-log plot of the instantaneous voltage (in volts) versus the instantaneous current (in amps) yields a nearly horizontal line. Their current-voltage characteristics make varistors well suited for protection of sensitive electronic circuits against electrical surges, over-voltages, faults, and shorts. When subjected to a voltage exceeding its voltage limit, the varistor becomes highly conductive, absorbs and dissipates the energy related to the over-voltage, and typically limits the current to a neutral line or ground plane.

One significant limitation of a varistor is that during a power surge when a varistor is conducting high currents, it will generate heat in excess of what it can satisfactorily dissipate. The heat is generally proportional to the area of the varistor as well as the wave shape of the current and is a limiting factor in the capability of the varistor to conduct current. If an over-voltage condition is not timely discontinued, the varistor can continue to increase in temperature and can ultimately fail, i.e., rupture or explode. It is possible for such a failure to destroy nearby electronic components and equipment. The failure of a varistor in a surge suppression system may allow the fault condition to reach the sensitive electronic equipment the system was designed to protect.

Others have provided structures to prevent or ameliorate the over heating problems discussed above. For example U.S. Pat. No. 6,430,019 issued to Martenson et. al. discloses a “thermal switch” which physically disconnects electrical connection of the voltage sensitive device from its circuit upon an over-voltage thermal event. However, the structures disclosed in Martenson et. al. require a number and type of components, and arrangement of those components, that would appear to complicate construction and operation of the circuit protection device.

Thus, there presently is a need for a reliable and compact mechanism to prevent thermally related failures of circuit protection devices.

The present invention is provided to address these needs and to provide other advantages.

SUMMARY OF THE INVENTION

Generally the invention is directed to a circuit protection device having a voltage sensitive element (such as an MOV) that is electrically connected in its operative circuit by a moveable conductor arm. Upon exceeding an unacceptable temperature in the voltage sensitive element, the conductor arm is physically moved out of contact with a terminal connected to the voltage sensitive element by a biasing spring so as to open the circuit of the protection device.

According to one embodiment of the invention a circuit protection device comprises a voltage sensitive element having a first terminal and a second terminal. The second terminal of the voltage sensitive element includes an attachment surface. A conductor arm includes an attachment surface and is releasably connected—via a thermal connector—to the voltage sensitive element. That is, the attachment surface of the conductor arm is releasably coupled to the attachment surface of the second terminal of the voltage sensitive element. The connector arm is biased to move—when released by the thermal connector—in a direction along a line having an acute angle with respect to a plane defined by a lateral dissection between the connected attachment surfaces, the angle being no greater than 45° on either side of the plane. However, for among other things, optimizing space savings, the angle of movement is optimally approximately between 0° and 10°, but more optimally between 0° and 5°, on either side of the plane. The first and second terminals and the attachment surfaces can be oriented with respect to the main body of the voltage sensitive device such that this proscribed motion will provide a reliable and compact component for a circuit protection device. This is particularly advantageous when the movement coincides with the conductive arm moving laterally along a face of a disc-shaped varistor.

According to another embodiment of the invention, a spring is directly connected between the conductor arm and a support structure of the circuit protection device. The spring biases the conductor arm to move the conductor arm upon release of the conductor arm from a terminal connected to the voltage sensitive element. In one embodiment the spring is in axial tension when the conductor arm is connected to the second terminal and retracts to move the conductor arm upon its release from the second terminal of the voltage sensitive device. In alternate embodiments the spring is configured to be in torsional stress when the conductor arm is connected to the second terminal of the voltage sensitive element and relaxes the stress to move the conductor arm upon its release from the second terminal.

In an embodiment of the invention, the voltage sensitive element is a varistor, such as a metal oxide varistor and the thermal connector is a low-temperature solder which liquefies at a temperature between 114-124° C.

In another embodiment of the invention, the above-mentioned circuit protection devices may include a second voltage sensitive element and a second conductor arm. The conductor arms are both situated in a space defined between the two voltage sensitive elements. Due to the shape of the conductor arms and the direction of their movement upon release, the two voltage sensitive elements can be packaged relatively closely to each other in a single package with a relatively smaller footprint Yet another embodiment of the present invention provides a circuit protection device including a voltage sensitive element having a first terminal and a second terminal; the second terminal further having an attachment surface. A thermal conductor releasably attaches an attachment surface of a conductor arm to the attachment surface of the second terminal of the voltage sensitive element. The conductor arm is biased by a spring held in torsional stress wherein the spring as it relaxes moves the conductor arm away from the second terminal of the voltage sensitive device upon release of the thermal connector. In an alternative embodiment the conductor arm is biased by a spring which is directly connected between the conductor arm and a support structure. The spring is held in axial tension.

In an embodiment of the invention, a circuit protection device includes a moveable conductor arm being connected to a terminal remote from the voltage sensitive device by a flexible conductor such as a braided or twisted wire cable.

In an embodiment of the circuit protection device of the invention, a moveable conductor arm comprises an integral flat conductive ribbon having a first end having an attachment surface oriented for attachment to the attachment surface of a voltage sensitive element and having a second end conductively coupled to a remote terminal used for connecting the circuit protection device to a circuit to be protected. A middle portion of the conductor arm is coiled to provide bias to the first end of the conductor arm so as to move it away from the second terminal of the voltage sensitive element upon release of a thermal connector.

One object of the present invention is to provide a compact and reliable circuit protection device which is less susceptible to a failure caused by excessive heat generated by a voltage sensitive device such as a varistor.

Other advantages and aspects of the present invention will become apparent upon reading the following description of the drawings and detailed description of the invention.

DETAILED DESCRIPTION OF THE INVENTION

Figure 2:
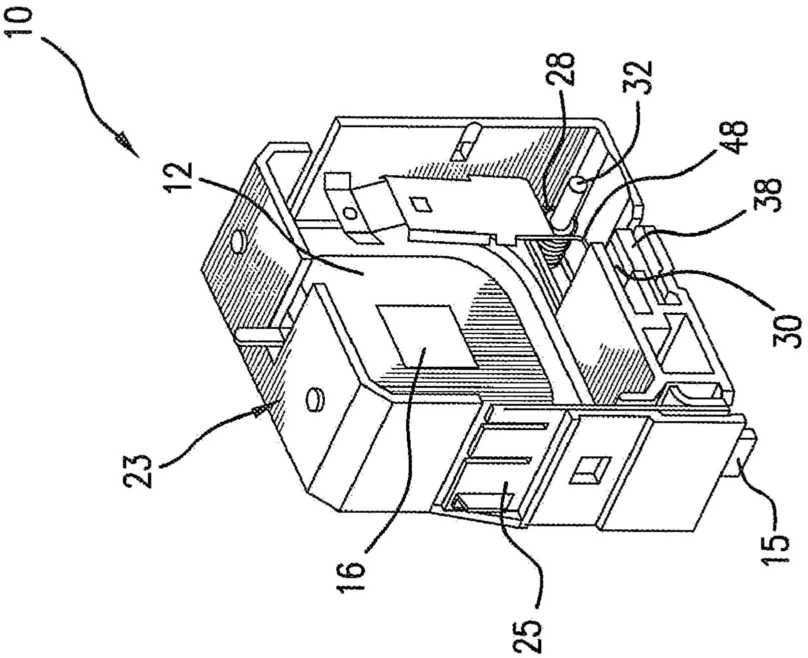
FIG. 2 is a perspective view of the embodiment of FIG. 1 with the conductor arm released from the second terminal of the voltage sensitive element.

While the present invention is capable of embodiment in many different forms, there is shown in the drawings and will herein be described in detail exemplary embodiments of the invention with the understanding that the present disclosure is to be considered as an exemplification of the principles of the invention and is not intended to limit the broad aspect of the invention to the embodiments illustrated. Like parts used in the various embodiments disclosed may use the same reference numbers unless otherwise stated.

FIGS. 1-6 disclose a circuit protection device 10 according to one embodiment of the invention. The circuit protection device 10 includes a voltage sensitive element 12, a conductor arm 20, a thermal connector 24, a spring 28, a first common terminal 25, a second common terminal 30 (see also FIG. 14), a housing 23, and terminals 15 and 17 extending from the housing for connecting the circuit protection device 10 to a circuit to be protected.

Figure 4:
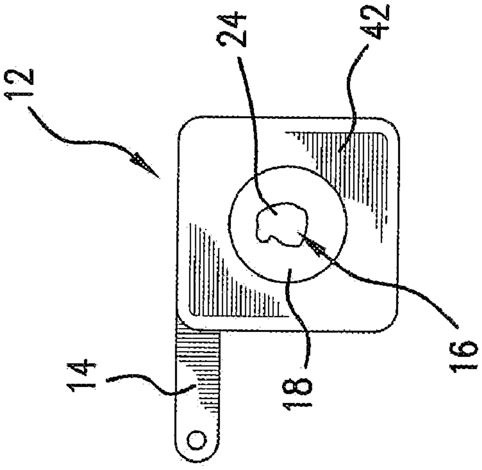
FIG. 4 is a plan view of one embodiment of the voltage sensitive element of the present invention.
Figure 5:
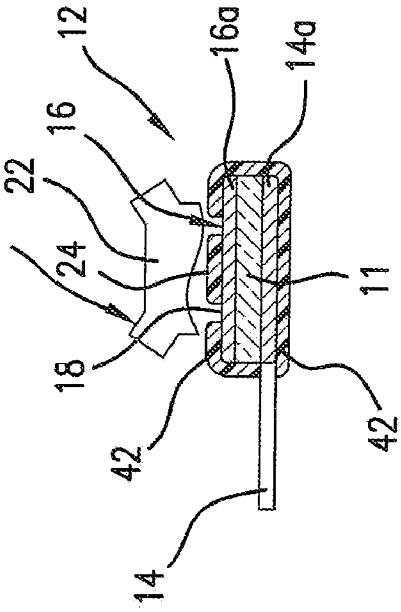
FIG. 5 is a is a cross-sectional front view of the voltage sensitive element shown in FIG. 4.

FIGS. 4 and 5 disclose that the voltage sensitive device 12 is in the form of a metal-oxide varistor (also referred to herein as "MOV 12" or "varistor 12"). The MOV 12 can be comprised for example, of a semiconductor material 11 which can include zinc oxide granules. The material 11 is sandwiched between conductive plates 14*a* and 16*a*. The plate 14*a* has a blade or tab-type extension forming a first terminal 14 of the MOV 12 while in this instance the conductive plate 16*a* defines a second terminal 16 for electrically connecting to the MOV 12.

Figure 7:
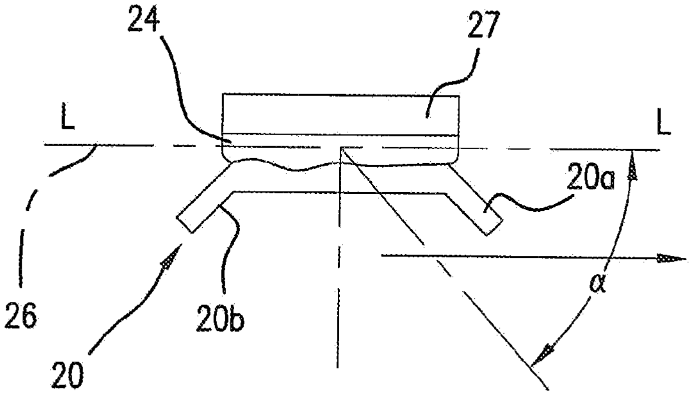
FIG. 7 is a schematic view of an alternate embodiment of the present invention depicting an alternate shape of the second terminal and relative movement between the attachment surface of the conductor arm and the second terminal.
Figure 8:
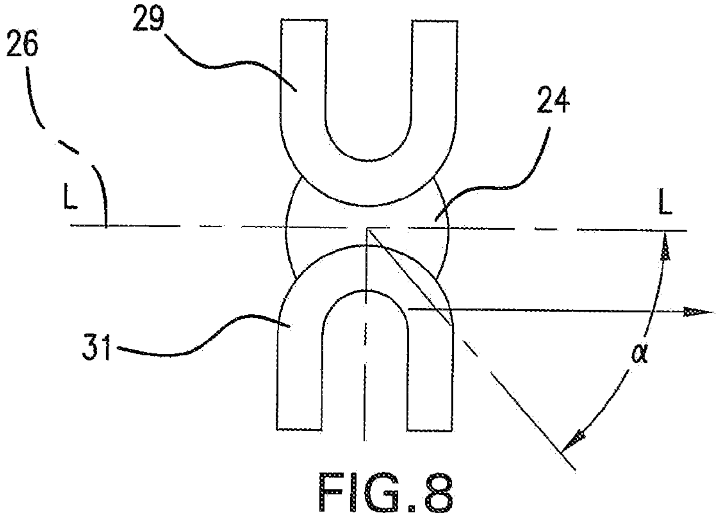
FIG. 8 is a schematic view of an alternate embodiment of the second terminal of the present invention depicting relative movement between the conductor arm attachment surface and the attachment surface of the second terminal.

In other embodiments, for example those terminals schematically disclosed in FIGS. 7 and 8, the second terminal 16 could be in any useful shape or form for electrical connection to the plate 16*a*, including a tab or blade-type terminal. However, in the circuit protection device 10, employing plate 16*a* (more particularly an attachment surface 18 on the plate 16*a*) as the second terminal 16 has the advantage of increasing the sensitivity to thermal events in the MOV 12.

Figure 1:
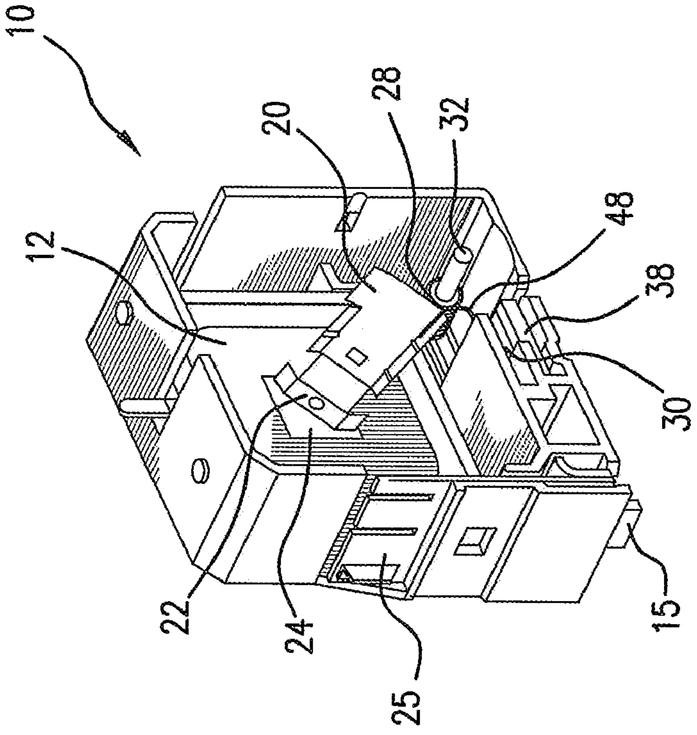
FIG. 1 is a perspective of one embodiment of the present invention with a voltage sensitive element mounted in a housing with a conductor arm conductively attached to the voltage sensitive element.
Figure 3:
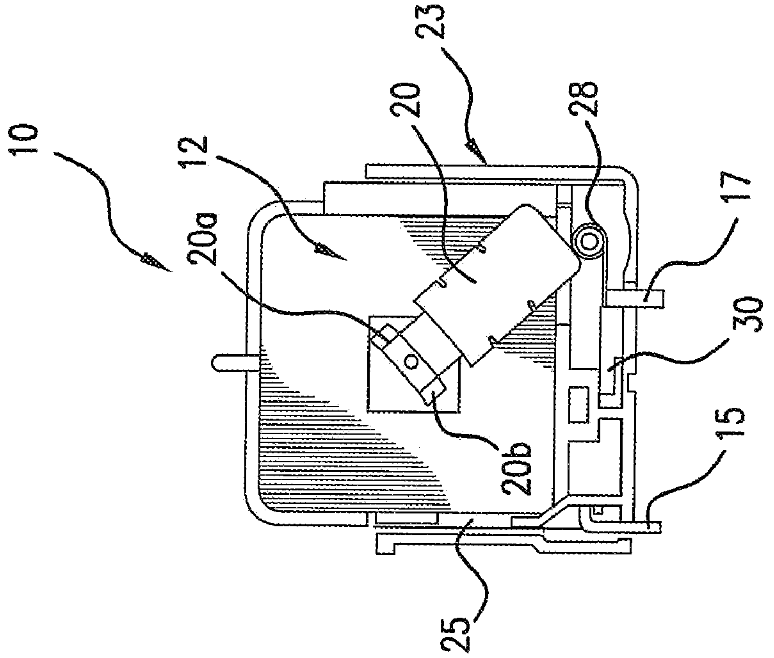
FIG. 3 is a front view of the embodiment of FIG. 1.
Figure 6:
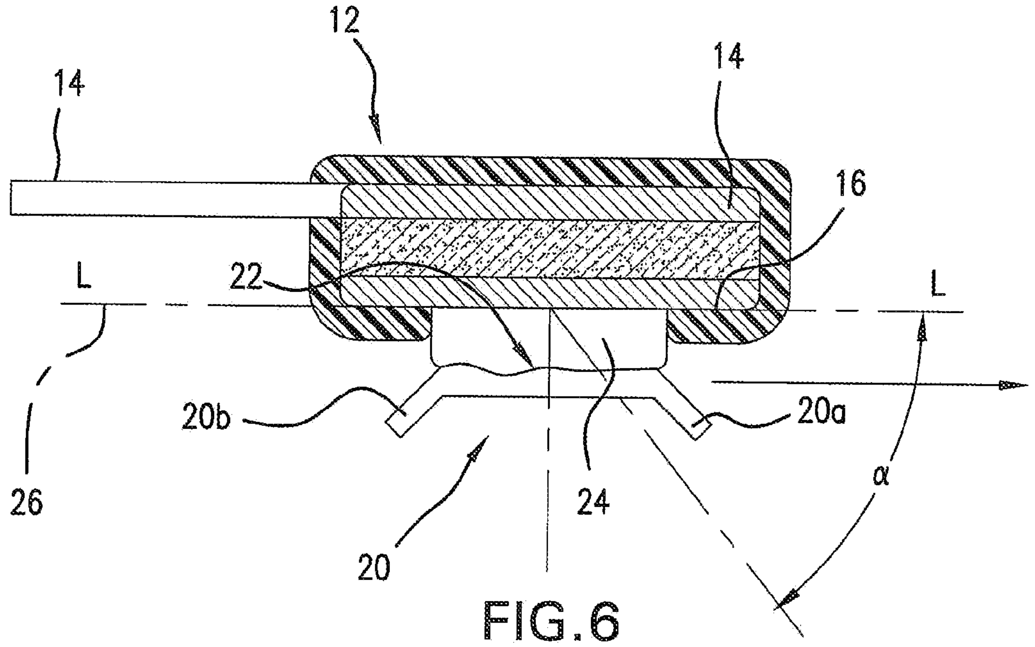
FIG. 6 is a schematic cross-sectional view of the embodiment of FIG. 1 depicting relative movement between the conductor arm and the voltage sensitive element.

FIGS. 1-3 disclose a conductor arm 20 which is electrically connected between the MOV 12 and terminal 17. As better disclosed in FIG. 6, the conductor arm 20 has an attachment surface 22. FIGS. 5 and 6 disclose that the attachment surface 22 is releasably attached to the attachment surface 18 of the second terminal 16 of the MOV 12 by the thermal connector 24. The thermal connector 24 can be selected to release (in this case liquefy) at any desired temperature depending on the desired tolerance for heat build up in the MOV 12. For example, a low-temperature solder bump is capable of operably coupling the attachment surface 22 of the conductor arm 20 with the attachment surface 18 of the second terminal 16. The low-temperature solder 24 can be chosen to liquefy well below the temperature required to melt conventional solder connections, i.e. 183° C. For example there are solders available which liquefy at between 114-124° C.

FIGS. 1 and 2 disclose that the conductor arm 20 is biased by spring 28 to move when released by liquefaction of the thermal connector 24. As further disclosed in FIG. 6, the direction of movement is in a direction along a line (indicated by the arrow in FIG. 6) having an angle a with respect to a plane 26 defined by a lateral dissection (indicated by line L-L of FIG. 6) between the connected attachment surfaces 18 and 22. Referring again to FIG. 6, the angle a is not greater than 45°—and is optimally between 0° (parallel) and 10°—or 0° to 5° on either side of the plane 26.

Figure 14:
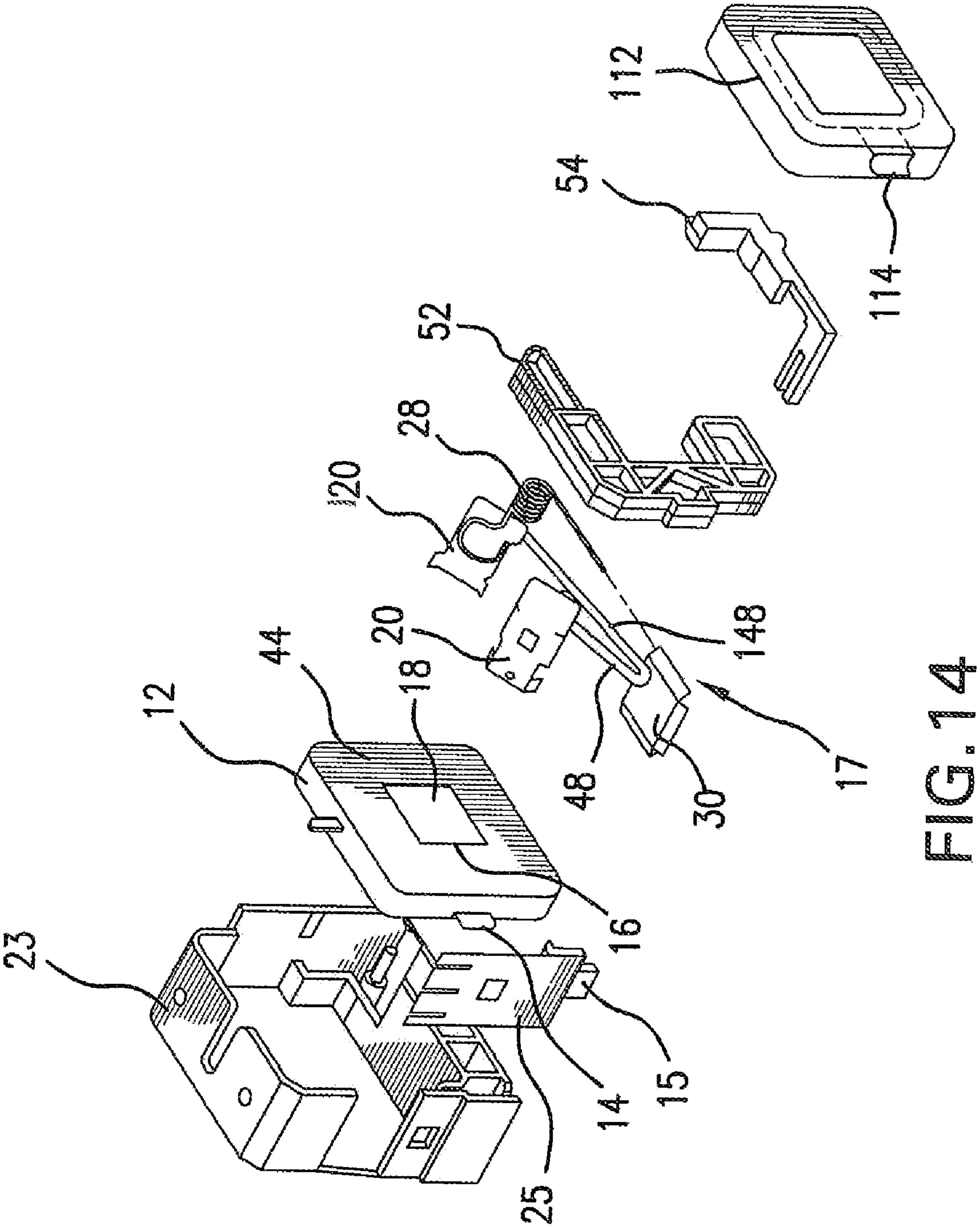
FIG. 14 is an exploded view of the embodiment of FIGS. 12 and 13.

Referring back to FIGS. 1-3, and to FIG. 14, it can be seen that the conductor arm 20 is biased by spring 28. In this embodiment, the spring 28 may or may not be conductive. One end of spring 28 is operably connected to the conductor arm 20 and the other end is connected to a common terminal plate 30 which is in turn integrally connected to terminal 17. The spring 28 can be connected to the common terminal plate 30 through a variety of means however, as is shown in FIGS. 3 and 14 one end of the spring 28 resides within a tubular spring holder 38 formed from the same piece of metal as the common terminal plate 30. The helix of the spring 28 is secured by a spring pin 32 of housing 23. In this configuration, when positioned as shown in FIGS. 1 and 3, the spring 28 is placed in torsional stress to bias the conductor arm 20.

FIG. 2 depicts the circuit protection device 10 after the MOV 12 has heated to the point of liquefying the thermal connector 24 and thereby releasing the conductor arm 20, thus enabling it to move laterally and off to the side—generally parallel with the plane 26 defined by a lateral dissection between the connected attachment surfaces 18 and 22. As can be seen in FIG. 2, the contact surface 22 of conducting arm 20 has moved after a triggering thermal event in the MOV 12, to a safe position well away from the second terminal 16 and is nearby only to the housing 23 which is a non-conductive plastic and to the insulating material on a remote portion of the MOV 12. This ending distance and location are meant to prevent incidental conduction with carbon or solder trails which may form upon a pre-or-post excessive thermal event.

The conductor arm 20 is electrically connected to the common terminal 30 by a flexible conductor such as a braided or twisted wire cable 48. This flexibility accommodates the distance moved by the conductor arm during assembly and after a release from attachment to the second terminal of the MOV 12.

The first common terminal 25 accepts MOV 12 tab terminal 14 into a slot therein. The common terminal is mounted within the housing 23 for this purpose and for structurally stabilizing the MOV 12 while providing at its distal end the terminal 15 for connecting to a circuit to be protected.

FIGS. 7 and 8 disclose schematically the beneficial movement of a conductor arm according to the invention on second terminal types of different from the second terminal 16. In particular FIGS. 7 and 8 disclose in schematic cross sectional views, two differently shaped terminals 27 and 29 respectively which are connected with low-temperature solder to two different attachment surfaces on moveable conductor arms such as conducting arm 20 (FIG. 7) and a conducting arm 31 respectively. As can be seen by the lines L-L in both FIGS. 7 and 8, and the arrows showing movement, the movement is in a line parallel ($\alpha=0°$) with the plane 26 dissecting the attachment surfaces between the attachment points of the terminals 27, 29 and the conductor arms 20 and 31. In other words, benefits according to the invention can be obtained for the relative movement of the attachment surfaces of the conductor arms 20, 31 and the attachment surfaces of the terminals away from each other in a lateral direction even where the terminals are more remote from the voltage sensitive element and where the attachment surfaces are shaped other than flat.

Figure 9:
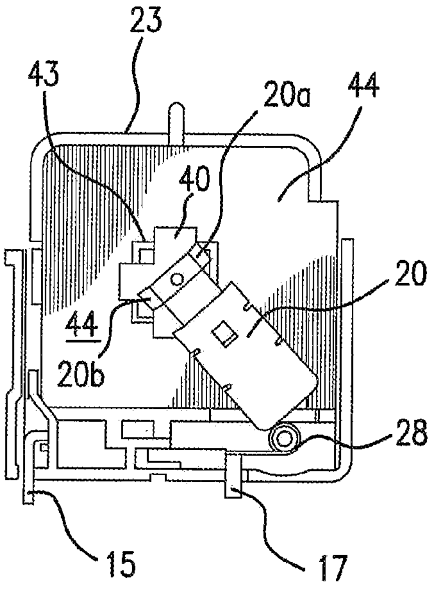
FIG. 9 is a front view of an alternate embodiment of the present invention with the voltage sensitive element mounted in a housing with the conductor arm conductively attached to a conductive contact defining the second terminal.
Figure 10:
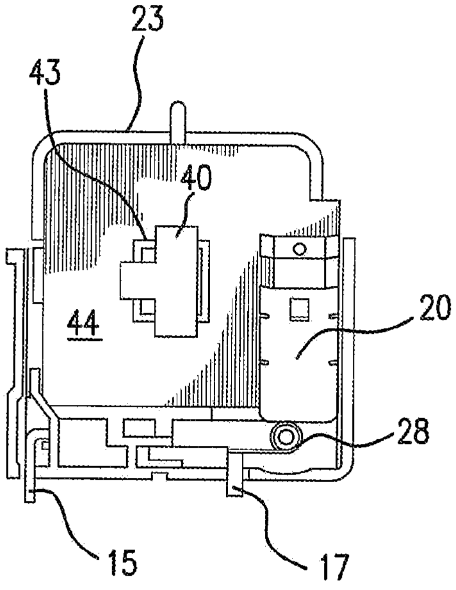
FIG. 10 is front view of the embodiment of FIG. 9 with the conductor arm released from the conductive contact.
Figure 11:
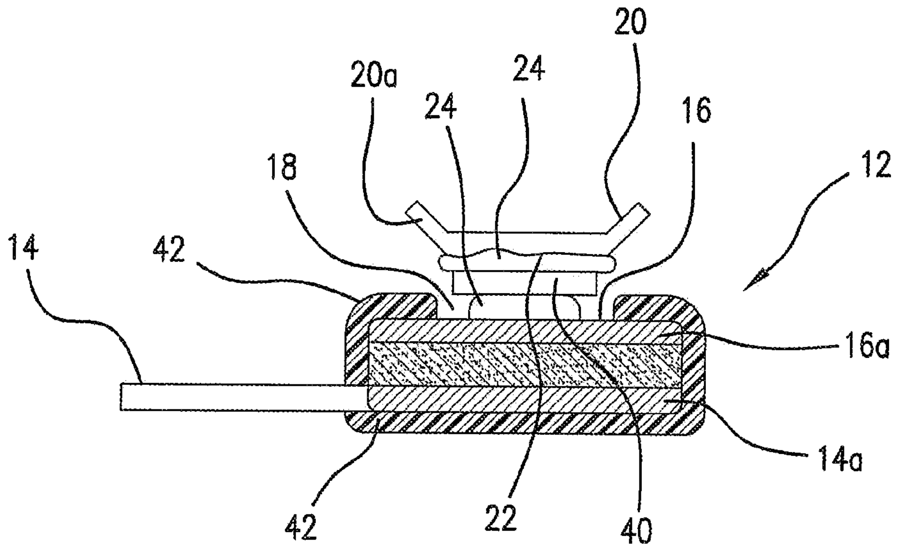
FIG. 11 is a schematic cross-sectional side view of the conductive contact connected to the voltage sensitive element.

Another embodiment of the present invention is shown in FIGS. 9-11 wherein a conductive contact, or terminal pad 40 is utilized to facilitate initial lateral movement of the conductor arm 20. More specifically as disclosed in FIG. 11, the MOV 12 has a non-conductive material 42, e.g., epoxy or other insulating material, which substantially encases the MOV 12. A portion of the second plate 16*a* forming the second terminal 16 remains exposed but presents a lip or edge in the coating which could impede the movement of the conducting arm 20. Thus the terminal pad 40 is coupled to the exposed portion of the second terminal 16 to offset the attachment surface 18. As shown in FIG. 11, the terminal pad 40 is positioned to extend a distance beyond the non-conductive material 42. The conductor 20 in this embodiment is releasably attached to the terminal pad 40 (now defining a second terminal) at attachment surface 22 by thermal connector 24. In this configuration, upon initial movement of the conductor arm 20 away from the terminal pad 40, the arm is prevented from snagging on an edge of the coating 42 or other obstacles surrounding the dielectric coating in that area.

FIGS. 9 and 10 disclose an auxiliary insulating sheet 44 which may also be used with the circuit protection device 10. The sheet 44 of dielectric material, e.g., mica, has an opening 43 disposed proximate the second terminal 16 of the MOV 12 and the opening 43 is sized relative to the terminal pad 40 such that a portion of the sheet 44 lies between the MOV 12 and the conductive contact 40. This configuration helps to secure the insulating sheet 44 while also preventing an edge of its opening 43 from obstructing movement of the conductor arm 20. It should also be noted that canted edges 20*a* and 20*b* (see e.g. FIGS. 3 and 11) on the conductor arm 20 also provide assistance in avoiding obstruction by irregularities in the structures within the path of conductor arm 20 when it moves.

Figure 12:
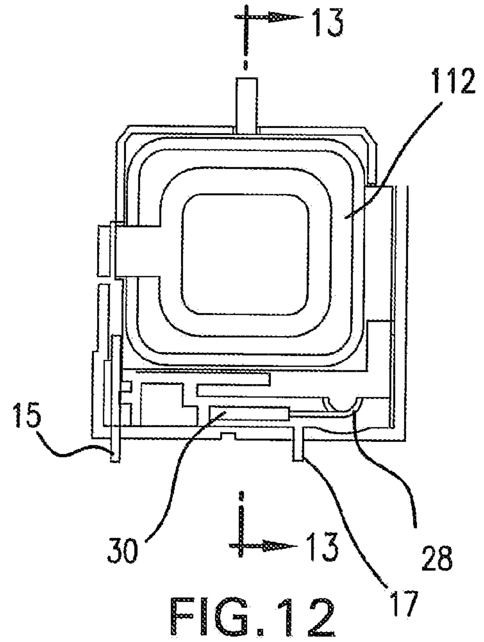
FIG. 12 is a front view of another embodiment of the present invention with two voltage sensitive elements within a single housing.
Figure 13:
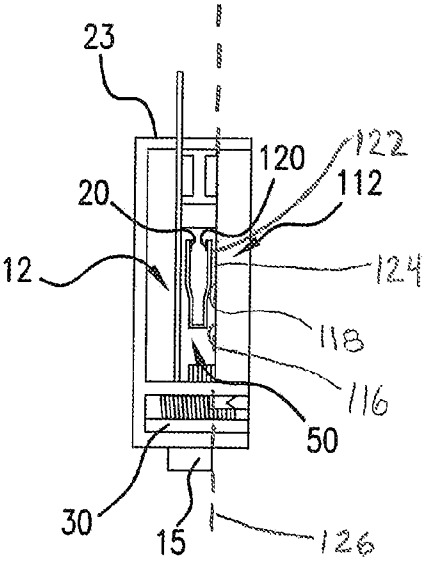
FIG. 13 is a cross-sectional view of the embodiment of FIG. 12 taken along line 13-13 of FIG. 12.

FIGS. 12-14 show configurations of an alternative embodiment of the present invention wherein multiple—optimally two—MOV 12 are configured within the housing 23. A second MOV 112 has a first terminal 114 and a second terminal 116. The second terminal 116 of the second MOV 112 has an attachment surface 118. A second conductor arm 120 includes an attachment surface 122 wherein a second thermal connector 124 releasably connects the attachment surface 118 of the second terminal 116 of the second MOV 112 to the attachment surface 122 of the second conductor arm 120. The second conductor arm 120 is biased to move in a direction generally parallel with a second plane 126 defined by a second lateral dissection between the connected attachment surfaces 118, 122 of the second MOV 112 and the second conductor arm 120.

FIGS. 12-14 disclose various connecting structures for providing proper orientation of the MOVs 12, 112 and the conductor arms 20, 120, for securing them in the housing 23 and for providing conductive pathways for connecting the MOVs to a circuit to be protected. In particular, as disclosed in FIG. 13, the MOVs 12, 112 are connected together by connecting structure such that their respective conductor arms 20, 120 are contained in a space 50 defined between both MOVs 12 and 112.

Connecting structure may include the first common terminal 25 which accepts the terminals 14 and 114 from the respective MOVs 12 and 112 in slots formed in an upper portion of the common terminal 25. The common terminal 25 also fits into and cooperates with internal structure of the housing 23 in a way 50 as to assist secure placement and alignment of the MOVs 12 and 112 while also providing electrical connectivity through remote terminal 15 to a circuit to be protected. Similarly, the common terminal 30 is also adapted to secure a second spring 128 in a tubular connector 38 for biasing the conductor arm 120 while providing electrical connectivity for both conductor arms 20, 120 through remote terminal 17 to a circuit to be protected. The common terminal plate 30 also fits into and cooperates with the housing 23 in a way to secure proper orientation and spacing of the conductor arms 20, 120 with respect to their respective MOVs 12 and 112. A removable bulk head 52 in cooperation with a snap-lock connector 54 assists in providing a stable and secure seat for the fully-assembled structures in housing 23. The helical coil of both springs 28 and 128 are secured on spring pin 32 the unsecured end of which becomes capped and secured by the snap-lock connector 54.

FIG. 14 discloses that the second conductor arm 120 is also conductively connected to the second common terminal 30 via flexible conductor 148 in the form of a braided or twisted wire cable 148. In this duplex embodiment, the flexible connectors 48 and 148 may be made separately or can be formed from a single cable which is connected near its center to the common terminal 30.

It should be appreciated, in particular in view of FIG. 13, that the above-disclosed arrangements provide for a compact circuit protection device with a “foot print” which is advantageous for use in product designs where component space is at a premium.

For example, according to one aspect of the invention, arranging to have both moveable arms in the shared space 50, by itself permits space savings. In addition to that, the path of travel for the conductor arms 20, 120 provides a tight operational profile enhancing the ability to package the MOVs 20 and 120 closer together. In addition to that, it should be appreciated that the conductor arms 20 and 120 are substantially flat with opposing relatively wider flat surfaces compared to the relatively narrower opposing edge surfaces. This permits a wider surface to be oriented to face the attachment surfaces 18 and 118 for connection while aiding in space saving when the MOVs are spaced side-by-side as disclosed in FIG. 13.

It should also be appreciated that the conductor arm and spring assemblies disclosed the circuit protection devices of the present invention have advantages in terms of reliability and a relatively low part-count.

Figure 15:
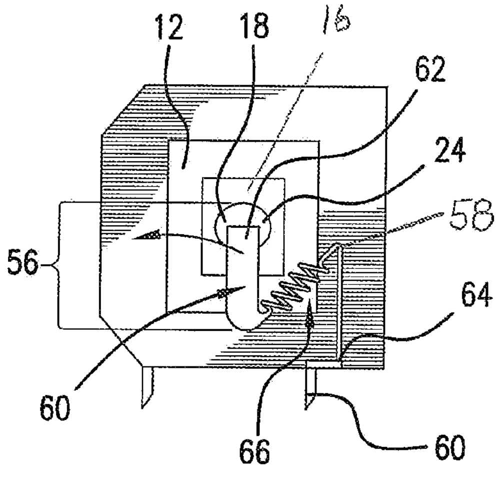
FIG. 15 is a schematic diagram of the present invention depicting an alternate embodiment of the conductor arm and biasing spring; and, FIG. 16 is a schematic diagram of the present invention depicting an alternate embodiment of the conductor arm and biasing spring.

FIG. 15 discloses in a schematic way, an alternative embodiment of a conductor arm 56 which may be used according to the invention. In particular, an integral flat conductive ribbon 58 is provided for releasable connection between the second terminal 16 of MOV 12 and a remote terminal 60 used for connecting the circuit protection device to a circuit to be protected. Thermal connector 24 (e.g. solder) is used for the temperature sensitive connector to join a first end 62 of the conductive ribbon 58 to second terminal 16 of MOV 12 as described above. A second end 64 of the conductive ribbon 58 is conductively coupled to the remote terminal 60. A middle portion 66 of the ribbon 58 is coiled so as to bias the first end 62 of the conductor arm to move away in the direction of the arrow in FIG. 16, from the terminal 16 of the MOV 12 upon release by the thermal connector 24.

Figure 16:
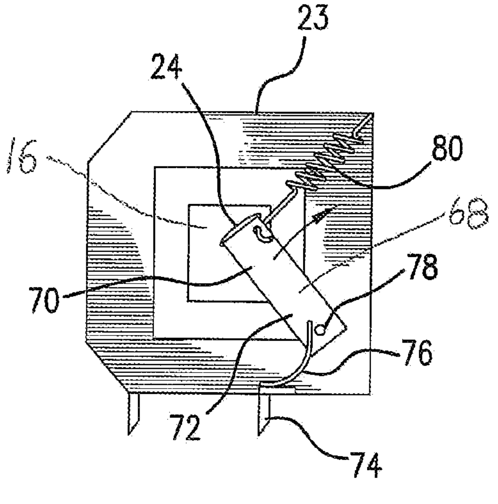

FIG. 16 discloses in a schematic way, an alternative embodiment of a conductor arm 68 according to the invention. The conductor arm 68 has a first end 70 releasably attached to the second terminal 16 of the MOV 12 by a thermal connector 24, while a second end 72 of the conductor arm 68 is conductively coupled with a remote terminal 74 by a flexible cable 76, such as a braided cable or a twisted wire bundle. End 72 of the conductor arm 68 is also pivotally connected to support structure (not shown) within the housing 23 by a pin 78 e.g. a rivet or the like. A spring 80 is directly connected between the conductor arm 68 and support structure (not shown) such as may be made available in a housing like housing 23 or other structures accommodating an anchoring point for one end of spring 80. As depicted in FIG. 16, the spring 80 is in axial tension while the conductor arm 70 is attached to the second terminal 16 of the MOV 12. Upon release of the end 70 of the conductor arm 68 by the thermal connector 24, the spring 80 will move the conductor arm 70 about its pivot in the direction of the arrow shown in FIG. 16. Optimally for compact packaging of this schematic embodiment, the conductor arm 68 will move in a direction along a line having an acute angle with respect to a plane defined by a lateral dissection between the connected attachment surfaces, the angle being no greater than 45° on either side of the plane. Optimally the angle $\alpha$ of movement is approximately between 0° and 10°, but more optimally between 0° and 5°, on either side of the plane.

While specific embodiments of the present invention have been illustrated and described numerous modifications come to mind without significantly departing from the spirit of the invention and the scope of protection is only limited by the scope of the accompanying claims.

What is claimed is:

1. A circuit protection device comprising:

a voltage sensitive element having a body;

a first terminal and a second terminal attached to the body, the second terminal having an attachment surface;

a conductor arm having an attachment surface; and, a thermal connector releasably connecting the attachment surface of the second terminal to the attachment surface of the conductor arm, the conductor arm being biased to move, when released by the thermal connector, in a direction along a line having an acute angle with respect to a plane defined by a lateral dissection between the connected attachment surfaces, the angle being no greater than 45° on either side of the plane and wherein the attachment surfaces are orientated with respect to the voltage sensitive element such that the conductor arm moves laterally across at least a portion of a face of the body of the voltage sensitive element.

2. The circuit protection device of claim 1 wherein the angle of movement is approximately between 0° and 10°, but more optimally between 0° and 5°, on either side of the plane.

3. The circuit protection device of claim 1 further comprising:
  a spring directly connected to the conductor arm, the spring biasing the conductor arm to move the conductor arm upon release of the conductor arm from the voltage sensitive element.

4. The circuit protection device of claim 3 wherein the spring is in axial tension when the conductor arm is connected to the second terminal and retracts to move the conductor arm upon its release from the second terminal of the voltage sensitive device.

5. The circuit protection device of claim 3 wherein the spring is in torsional stress when the conductor arm is connected to the second terminal and relaxes the stress to move the conductor arm upon its release from the second terminal.

6. The circuit protection device of claim 3 wherein the spring is in axial compression when the conductor arm is connected to the second terminal and axially extends to move the conductor arm upon its release from the second terminal.

7. The circuit protection device of claim 1 wherein the voltage sensitive element is a varistor.

8. The circuit protection device of claim 7 wherein the varistor is a metal oxide varistor.

9. The circuit protection device of claim 1 wherein the thermal connector is a low-temperature solder.

10. The circuit protection device of claim 9 wherein the low-temperature solder liquefies at a temperature between 114-124° C.

11. The circuit protection device of claim 1 further comprising:
  a second voltage sensitive element having a first terminal and a second terminal, the second terminal of the second voltage sensitive element having an attachment surface;
  a second conductor arm having an attachment surface; and,
  a second thermal connector releasably connecting the attachment surface of the second terminal of the second voltage sensitive element to the attachment surface of the second conductor arm, the second connector arm being biased to move in a direction generally parallel with a second plane defined by a second lateral dissection between the connected attachment surfaces of the second voltage sensitive element and the second conductor arm.

12. The circuit protection device of claim 11 wherein both voltage sensitive elements are connected together by a connecting structure such that their respective conductor arms are contained in a space defined between both voltage sensitive elements.

13. The circuit protection device of claim 12 wherein the connecting structure is situated in a housing at least partially surrounding the voltage sensitive devices.

14. The circuit protection device of claim 12 wherein the connecting structure includes a first common terminal for conductively coupling the first terminals of the voltage sensitive devices.

15. The circuit protection device of claim 14 wherein the connecting structure includes a second common terminal for conductively coupling the conducting arms.

16. The circuit protection device of claim 1 including a braided conductor connected between the conductor arm and a remote third terminal adapted for connection to a circuit to be protected.

17. The circuit protection device of claim 16 including the braided conductor connecting between the conductor arms and the second common terminal.

18. The circuit protection device of claim 1 wherein the conductor arm is substantially flat with opposing relatively wider flat surfaces relative to opposing relatively narrower edge surfaces, at least one of the wider surfaces being oriented to face the voltage sensitive device.

19. The circuit protection device of claim 1 wherein the voltage sensitive device is an MOV and at least the second terminal is in direct contact with a semiconductor core of the MOV.

20. The circuit protection device of claim 1 further comprising:
  a non-conductive material substantially encasing the voltage sensitive element wherein a portion of the second terminal remains exposed; and,
  a conductive contact coupled to the exposed portion of the second terminal, the conductive contact is positioned to extend a distance beyond the non-conductive material with respect to the plane.

21. The circuit protection device of claim 20 further comprising:
  a sheet of dielectric material having an opening, the sheet being disposed such that a portion of the sheet is between the voltage sensitive element and the conductive contact and such that the opening is adjacent and aligned with the exposed portion of the second terminal.

22. A circuit protection device comprising:
  a voltage sensitive element having a body;
  a first terminal and a second terminal attached to the body, the second terminal having an attachment surface;
  a conductor arm having an attachment surface; and,
  a thermal connector releasably connecting the attachment surface of the second terminal to the attachment surface of the conductor arm, the conductor arm being biased by a spring held in torsional stress, the spring as it relaxes moving the conductor arm away from the second terminal of the voltage sensitive device upon release of the thermal connector such that the conductor arm moves laterally across at least a portion of a face of the body of the voltage sensitive element.

23. The circuit protection device of claim 22 wherein the conductor arm moves when released by the thermal connector, in a direction along a line having an angle with respect to a plane defined by a lateral dissection between the connected attachment surfaces, the angle being no greater than 45° on either side of the plane.

24. The circuit protection device of claim 22 wherein the spring is connected directly to the conductor arm.

25. A circuit protection device comprising:
  a voltage sensitive element having a body;
  a first terminal and a second terminal attached to the body, the second terminal having an attachment surface;
  a conductor arm having an attachment surface;
  a spring connected directly to the conductor arm; and,
  a thermal connector releasably connecting the attachment surface of the second terminal to the attachment surface of the conductor arm, the conductor arm being biased by a spring held in tension, the spring as it relaxes moving the conductor arm away from the second terminal of the voltage sensitive device upon release of the thermal connector such that the conductor arm moves laterally across at least a portion of a face of the body of the voltage sensitive element.

26. The circuit protection device of claim 25 wherein the conductor arm moves when released by the thermal connector, in a direction along a line having an acute angle with respect to a plane defined by a lateral dissection between the connected attachment surfaces, the angle being no greater than 45° on either side of the plane.

27. A circuit protection device comprising:

a voltage sensitive element having a body;

a first terminal and a second terminal attached to the body, the second terminal having an attachment surface;

a conductor arm having an attachment surface;

a thermal connector releasably connecting the attachment surface of the second terminal to the attachment surface of the conductor arm, the conductor arm being biased by a spring to move the conductor arm away from the second terminal of the voltage sensitive device upon release of the thermal connector such that the conductor arm moves laterally across at least a portion of a face of the body of the voltage sensitive element; and, a flexible conductor in the form of a braided or twisted wire bundle connected between the conductor arm and a remote terminal of the circuit protection device.

28. A circuit protection device comprising:

a voltage sensitive element having a first terminal and a second terminal, the second terminal having an attachment surface;

a conductor arm having an attachment surface; and, a thermal connector releasably connecting the attachment surface of the second terminal of the voltage sensitive element to the attachment surface of the conductor arm, the conductor arm being an integral flat conductive ribbon having a first end having the attachment surface and being oriented for attachment whereby the attachment surface may contact the second terminal attachment surface and a second end conductively coupled to a remote terminal assembly for installing the circuit protection device in a circuit to be protected, and a middle portion of the conductor arm being coiled to bias the first end of the conductor arm to move away from the second terminal of the voltage sensitive device upon release of the thermal connector.

29. A circuit protection device comprising:

a voltage sensitive element having a first terminal and a second terminal, the second terminal having an attachment surface;

a conductor arm having an attachment surface;

a thermal connector releasably connecting the attachment surface of the second terminal of the voltage sensitive element to the attachment surface of the conductor arm, the conductor arm being biased to move away from the second terminal when released by the thermal connector;

a second voltage sensitive element having a first terminal and a second terminal, the second terminal of the second voltage sensitive element having an attachment surface;

a second conductor arm having an attachment surface;

a second thermal connector releasably connecting the attachment surface of the second terminal of the second voltage sensitive element to the attachment surface of the second conductor arm, the second connector arm being biased to move away from the second terminal of the second voltage sensitive device upon release of the thermal connector; and, both voltage sensitive elements are connected together by a connecting structure such that their respective conductor arms are contained in a space defined between both voltage sensitive elements.

30. The circuit protection device of claim 29 wherein the connecting structure is situated in a housing at least partially surrounding the voltage sensitive devices.

31. The circuit protection device of claim 30 wherein the connecting structure includes a first common terminal for conductively coupling the first terminals of the voltage sensitive devices and a second common terminal for conductively coupling the conducting arms.

32. The circuit protection device of claim 29 including a braided conductor connected between the conductor arm and a remote third terminal adapted for connection to standard fixtures.

33. The circuit protection device of claim 31 including braided conductors connecting between the conductor arms and the second common terminal.

34. The circuit protection device of claim 29 wherein the conductor arm is substantially flat with opposing relatively wider flat surfaces relative to opposing relatively narrower edge surfaces, at least one of the wider surfaces being oriented to face the voltage sensitive device.

35. The circuit protection device of claim 29 wherein the voltage sensitive device is an MOV and at least the second terminal is in direct contact with the semiconductor core of the MOV.

36. A circuit protection device comprising:

a voltage sensitive element having a first terminal and a second terminal, the second terminal having an attachment surface;

a conductor arm having an attachment surface wherein the conductor arm is substantially flat with opposing relatively wider flat surfaces relative to opposing relatively narrower edge surfaces, at least one of the wider surfaces being oriented to face the voltage sensitive device; and, a thermal connector releasably connecting the attachment surface of the second terminal of the voltage sensitive element to the attachment surface of the conductor arm, the conductor arm being biased to move, when released by the thermal connector, in a direction along a line having an acute angle with respect to a plane defined by a lateral dissection between the connected attachment surfaces, the angle being no greater than 45° on either side of the plane.

37. A circuit protection device comprising:

a voltage sensitive element having a first terminal and a second terminal, the second terminal having an attachment surface;

a conductor arm having an attachment surface;

a spring directly connected to the conductor arm, the spring biasing the conductor arm to move the conductor arm upon release of the conductor arm from the voltage sensitive element, wherein the spring is in axial tension when the conductor arm is connected to the second terminal and retracts to move the conductor arm upon its release from the second terminal of the voltage sensitive device; and a thermal connector releasably connecting the attachment surface of the second terminal of the voltage sensitive element to the attachment surface of the conductor arm, the conductor arm being biased to move, when released by the thermal connector, in a direction along a line having an acute angle with respect to a plane defined by a lateral dissection between the connected attachment surfaces, the angle being no greater than 45° on either side of the plane.

38. A circuit protection device comprising:

a voltage sensitive element having a first terminal and a second terminal, the second terminal having an attachment surface;

a conductor arm having an attachment surface;

a spring directly connected to the conductor arm, the spring biasing the conductor arm to move the conductor arm upon release of the conductor arm from the voltage sensitive element, wherein the spring is in axial compression when the conductor arm is connected to the second terminal and axially extends to move the conductor arm upon its release from the second terminal; and, a thermal connector releasably connecting the attachment surface of the second terminal of the voltage sensitive element to the attachment surface of the conductor arm, the conductor arm being biased to move, when released by the thermal connector, in a direction along a line having an acute angle with respect to a plane defined by a lateral dissection between the connected attachment surfaces, the angle being no greater than 45° on either side of the plane.

* * * * *